United States Patent
Pradeepkumar et al.

(10) Patent No.: US 12,081,079 B2
(45) Date of Patent: Sep. 3, 2024

(54) ELECTRIC MACHINE FOR HYBRID/ELECTRIC VEHICLE

(71) Applicant: FORD GLOBAL TECHNOLOGIES, LLC, Dearborn, MI (US)

(72) Inventors: Akash Changarankumarath Pradeepkumar, Westland, MI (US); Singar Rathnam, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 546 days.

(21) Appl. No.: 17/471,412

(22) Filed: Sep. 10, 2021

(65) Prior Publication Data

US 2023/0081983 A1 Mar. 16, 2023

(51) Int. Cl.
| | |
|---|---|
| *H02K 11/25* | (2016.01) |
| *H02K 1/16* | (2006.01) |
| *H02K 3/12* | (2006.01) |
| *H02K 3/28* | (2006.01) |
| *H02K 3/34* | (2006.01) |
| *H02K 3/48* | (2006.01) |
| *H02K 15/06* | (2006.01) |
| *B60K 6/26* | (2007.10) |

(52) U.S. Cl.
CPC ............... *H02K 11/25* (2016.01); *H02K 1/16* (2013.01); *H02K 3/12* (2013.01); *H02K 3/28* (2013.01); *H02K 3/34* (2013.01); *H02K 3/48* (2013.01); *H02K 15/064* (2013.01); *B60K 6/26* (2013.01)

(58) Field of Classification Search
CPC .. H02K 1/16; H02K 3/12; H02K 3/28; H02K 3/34; H02K 3/48; H02K 11/25; H02K 15/064; B60K 6/26
USPC .................................................... 310/71, 260
See application file for complete search history.

(56) References Cited

U.S. PATENT DOCUMENTS

| | | | |
|---|---|---|---|
| 10,377,217 B1* | 8/2019 | Pradeepkumar ... | H05K 7/20927 |
| 10,405,466 B1* | 9/2019 | Pradeepkumar .... | H01L 23/4006 |
| 11,097,721 B1* | 8/2021 | Zhao ....................... | B60K 6/485 |
| 11,339,740 B1* | 5/2022 | Zhao ....................... | F02D 41/08 |
| 2019/0267872 A1 | 8/2019 | Inoue | |
| 2019/0366823 A1* | 12/2019 | Pradeepkumar .... | H02M 7/5387 |
| 2019/0394907 A1* | 12/2019 | Pradeepkumar ...... | B60L 15/007 |
| 2020/0022278 A1* | 1/2020 | Pradeepkumar ..... | H05K 7/1474 |

(Continued)

FOREIGN PATENT DOCUMENTS

WO 2020216401 A1 10/2020

*Primary Examiner* — Rashad H Johnson
(74) *Attorney, Agent, or Firm* — David B Kelley; Brooks Kushman.P.C.

(57) ABSTRACT

A vehicle includes a battery, an electric machine, a thermistor, and a controller. The electric machine is configured to draw electrical power from the battery to propel the vehicle. The electric machine has a rotor and a stator. The stator has a core, interconnected hairpins, and a neutral bar. The core defines slots. The interconnected hairpin windings are arranged within the slots and are arranged to form a plurality of electrical phases. The neutral bar is connected to each of the electrical phases and defines an orifice. The thermistor is disposed within the orifice and is configured to sense a temperature of the electric machine. The controller is programmed to control a power output of the electric machine based on the temperature of the electric machine.

20 Claims, 8 Drawing Sheets

(56) References Cited

U.S. PATENT DOCUMENTS

| | | | |
|---|---|---|---|
| 2020/0259401 A1 | 8/2020 | Baba et al. | |
| 2020/0266689 A1* | 8/2020 | Dunn | |
| 2021/0172415 A1* | 6/2021 | Gibson | F02N 11/04 |
| 2021/0273513 A1* | 9/2021 | Siddiqui | H02K 5/225 |
| 2022/0034274 A1* | 2/2022 | Syed | F02N 11/04 |
| 2022/0063592 A1* | 3/2022 | Badreddine | B60W 30/188 |
| 2022/0126825 A1* | 4/2022 | March | B60W 30/146 |
| 2022/0250480 A1* | 8/2022 | Cox | B60L 7/24 |
| 2022/0311290 A1* | 9/2022 | Rathnam | B60K 6/26 |
| 2023/0011641 A1* | 1/2023 | Keum | H02K 3/24 |
| 2023/0063780 A1* | 3/2023 | Rathnam | H02K 15/14 |
| 2023/0080266 A1* | 3/2023 | Pradeepkumar | H02K 3/12 |
| | | | 310/68 C |
| 2023/0094431 A1* | 3/2023 | Zhao | B60L 1/02 |
| | | | 701/22 |
| 2023/0099071 A1* | 3/2023 | Ravichandran | F02N 11/04 |
| | | | 701/67 |
| 2023/0134509 A1* | 5/2023 | Leonardi | H02K 15/0056 |
| | | | 310/179 |
| 2023/0145148 A1* | 5/2023 | Joseph | H02K 15/0081 |
| | | | 310/54 |
| 2023/0163652 A1* | 5/2023 | Rathnam | H02K 3/345 |
| | | | 310/215 |
| 2023/0412037 A1* | 12/2023 | Pradeepkumar | H02K 3/522 |
| 2024/0017620 A1* | 1/2024 | Lee | H02K 11/25 |
| 2024/0056012 A1* | 2/2024 | Fatemi | B60L 50/51 |
| 2024/0097509 A1* | 3/2024 | Changarankumarath Pradeepkumar | H02K 3/12 |

\* cited by examiner

ELECTRIC MACHINE FOR HYBRID/ELECTRIC VEHICLE

TECHNICAL FIELD

The present disclosure relates to electric machines, including motors and/or generators that are utilized in hybrid and electric vehicles.

BACKGROUND

Hybrid and/or electric vehicles may include an electric machine that is configured to propel the vehicle.

SUMMARY

A vehicle includes a battery, an electric machine, a thermistor, and a controller. The electric machine is configured to draw electrical power from the battery to propel the vehicle. The electric machine has a rotor and a stator. The stator has a core, interconnected hairpins, and a neutral bar. The core defines slots. The interconnected hairpin windings are arranged within the slots and are arranged to form a plurality of electrical phases. The neutral bar is connected to each of the electrical phases and defines an orifice. The thermistor is disposed within the orifice and is configured to sense a temperature of the electric machine. The controller is programmed to control a power output of the electric machine based on the temperature of the electric machine.

An electric machine configured to a propel a vehicle includes a rotor, a stator, a neutral bar, and a sensor. The stator has windings arranged to form a plurality of electrical phases. The stator is configured to generate a magnetic field that interacts with the rotor to generate rotational motion. The neutral bar is connected to each of the electrical phases. The neutral bar defines at least one first orifice configured to receive terminals for each phase and a second orifice. The sensor is disposed within the second orifice. The sensor is configured to sense a temperature of the electric machine. The sensor is configured to communicate the temperature of the electric machine to a controller.

A vehicle includes a battery, an electric machine, a thermistor, and a clip. The electric machine is configured to draw electrical power from the battery to propel the vehicle. The electric machine has a rotor and a stator. The stator has windings comprising interconnected hairpins. The thermistor is configured to sense a temperature of the electric machine. The clip secures the thermistor to an upper end of a first pair of the interconnected hairpins.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
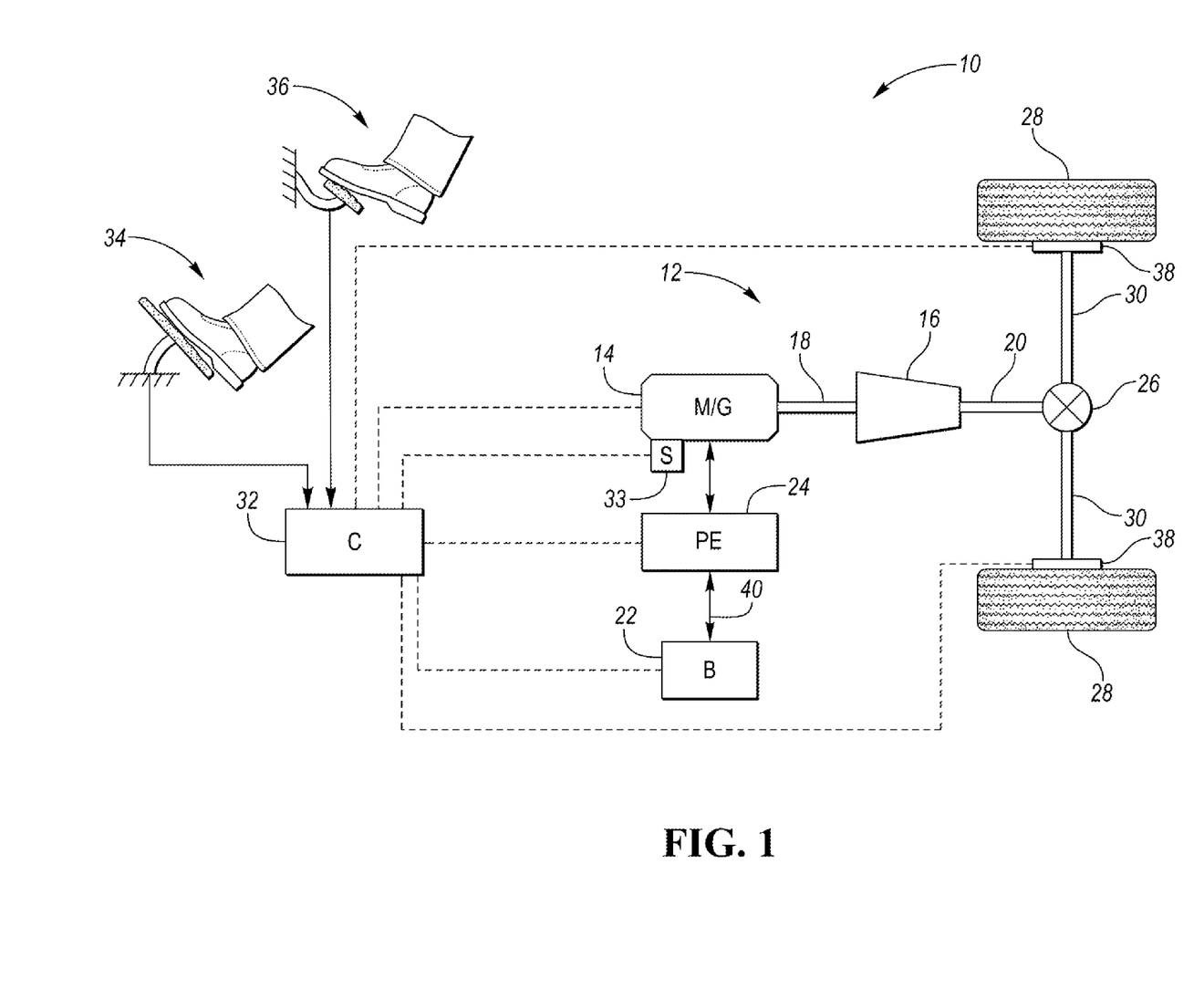
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 to propel the vehicle 10. The M/G 14 drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 is configured to draw electrical power from the battery 22 to propel the vehicle 10 in response to an acceleration request, which may be processed by a controller. The M/G 14 is also configured to deliver electrical power to the battery 22 to recharge the battery 22, which may occur during regenerative braking or during periods where another power source, such as an engine, is powering the M/G 14. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VS S), coolant temperature (ECT), accelerator pedal position (PPS), ignition switch position (IGN), ambient air temperature (e.g., ambient air temperature sensor), transmission gear, ratio, or mode, transmission oil temperature (TOT), transmission input and output speed, acceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

A temperature sensor 33 (e.g., a thermistor) may be being utilized to determine the temperature of the M/G 14. The temperature sensor 33 may be in communication with the controller 32 and may be configured to relay the temperature of the M/G 14 to the controller 32. The controller 32 may be programmed to control a power output of the M/G 14 based on the temperature of the M/G 14. For example, the controller 32 may be programmed to adjust the torque, speed, and/or power output of the M/G 14 to a desired torque, speed, and/or power output, which may be based on positions of the accelerator pedal 34 and/or the brake pedal 36, when the temperature of the M/G 14 is within a desired range. On the other hand, the controller 32 may be programmed to adjust the torque, speed, and/or power output of the M/G 14 to less than the desired torque, speed, and/or power output when the temperature of the M/G 14 is less than or greater than the desired range. If the temperature exceeds an upper limit or is less than a lower limit, the controller 32 may be programmed to shutdown the M/G 14 altogether.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

It should be understood that the vehicle configuration described herein is merely exemplary and is not intended to be limited. Other electric, or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
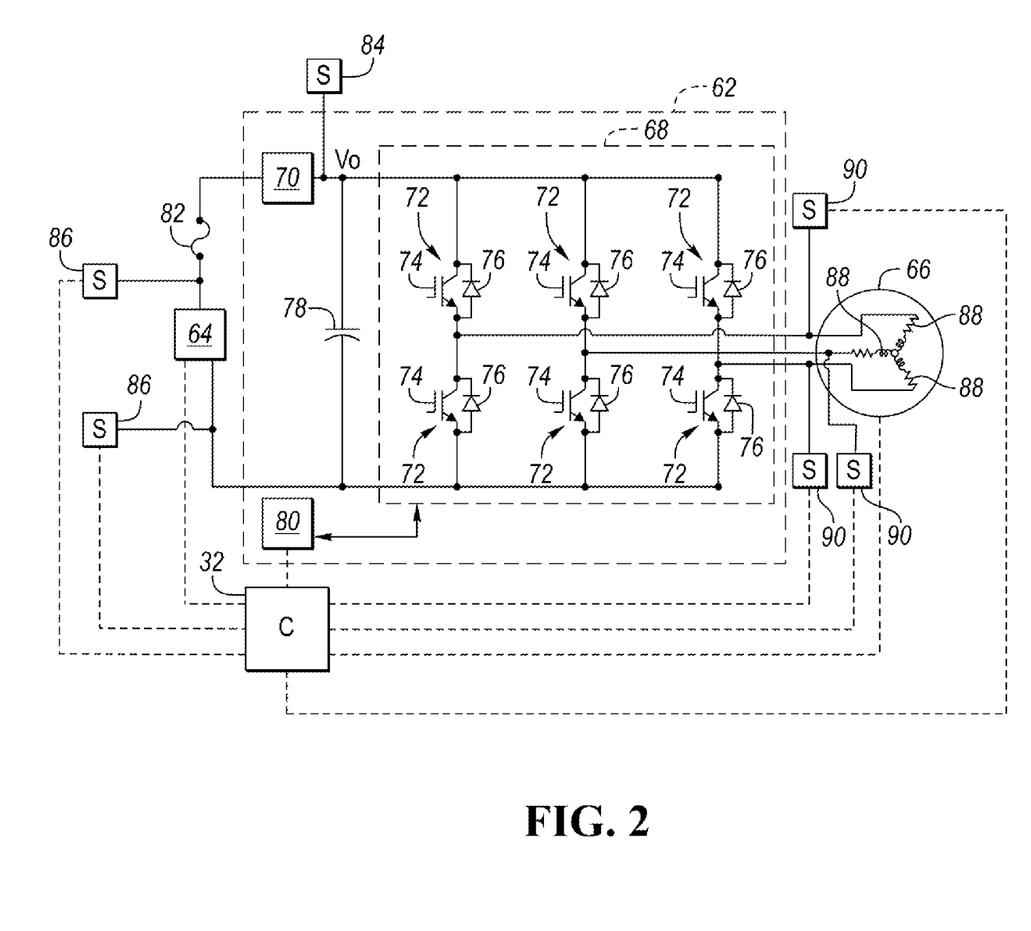
FIG. 2 is a circuit diagram of a power controller illustrating an inverter that is coupled to a DC power source and an electric machine.

Referring to FIG. 2, a circuit diagram of a power controller (or power supply device) 62 coupled to a power source 64 (e.g., battery 22) and an electric machine 66 (e.g., M/G 14) is illustrated. The power source 64 may be coupled to the power controller 62 in order to drive the electric machine 66. The power controller 62 may include an inverter 68 and a voltage converter 70. The voltage converter 70 may be DC to DC converter. Alternatively, the voltage converter 70 may be a separate component that is not integral to the power controller 62. The inverter 68 and the voltage converter 70 may be configured to deliver electrical power to the electric machine 66.

The inverter 68 includes inverting circuitry. The inverting circuitry may include switching units 72. The switching units 72 may each comprise a transistor 74, such as an insulated gate bipolar transistor (IGBT), in antiparallel with a diode 76. The switching units 72 may be configured to provide alternating current to the electric machine 66. More specifically, the inverter 68 may be configured to convert direct electrical current provided by the power source 64 into alternating electrical current, which is then delivered to the electric machine 66. The power controller 62 may include a linking capacitor 78. The linking capacitor 78 may be disposed between the power source 64 and the inverter 68. The linking capacitor 78 may be configured to absorb ripple currents generated at the inverter 68 or the power source 64, and stabilize the DC-link voltage, Vo, for inverter 68 control. Stated in other terms, the linking capacitor 78 may be arranged to limit voltage variation at an input of inverting circuitry due to ripple currents generated by the inverting circuitry or a battery, such as a traction battery, that may comprise the power source 64. The power controller 62 may include a drive board 80 for controlling the inverting circuitry. The drive board 80 may be a gate drive board that is configured to operate the transistors 74 of the switching units 72 of the inverter 68 when converting the direct current of the power source 64 into alternating current and delivering the alternating current to the electric machine 66.

The voltage converter 70 may include an inductor. The circuitry of the voltage converter (not shown), including the inductor, may be configured to amplify or increase the voltage of the electrical power being delivered to the electric machine 66 from the power source 64. A fuse 82 may be disposed on the direct current side of the inverter 68 to protect the inverting circuitry from surges in electrical power.

The disclosure should not be construed as limited to the circuit diagram of FIG. 2, but should be construed to include power control devices that include other types inverters, capacitors, converters, or combinations thereof. For example, the inverter 68 may be an inverter that includes any number of switching units and should not be construed as limited to the number of switching units depicted in FIG. 2. Alternatively, the linking capacitor 78 may be configured to couple one or a plurality of inverters to a power source.

The controller 32 may be in communication with the power source 64 (e.g., battery 22), the electric machine 66 (e.g., M/G 14), and the drive board 80. In response to a command to provide torque and power to propel the vehicle 10, the controller 32 may operate the power source 64, drive board 80, and electric machine 66 such that the desired power is delivered to the electric machine 66 from the power source 64 via the inverter 68 of the power controller 62. The power, electrical voltage, and/or electrical current may be monitored at various points within the system and communicated to and/or adjusted via the controller 32 to obtain the desired torque and/or power output the electric machine 66. The DC power, DC electrical voltage, and/or DC electrical current that is being delivered to the inverter 68 may be determined by sensor 84. The DC power, DC electrical voltage, and/or DC electrical current that is being generated by the power source 64 may be determined by one or more sensors 86. The AC power, AC electrical voltage, and/or AC electrical current that is being delivered to each winding phase 88 of the electric machine 66 may be determined by one or more sensors 90. More specifically, the winding phases 88 may represent several phases of windings on the stator of the electric machine 66 that are configured to generate magnetic fields that interact with magnets on the stator of the electric machine 66 to produce rotational motion. The controller 32 may include an algorithm that converts the various measurements to a torque or power being output of the electric machine 66.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by an electrical power source such as a traction battery of the vehicle. The traction battery may supply a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a suitable traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 3:
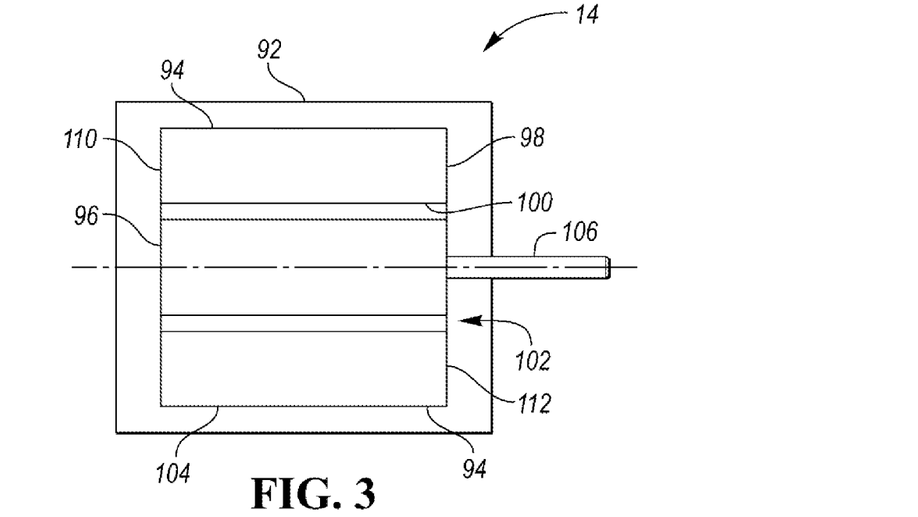
FIG. 3 is a schematic diagram of an electric machine.
Figure 4:
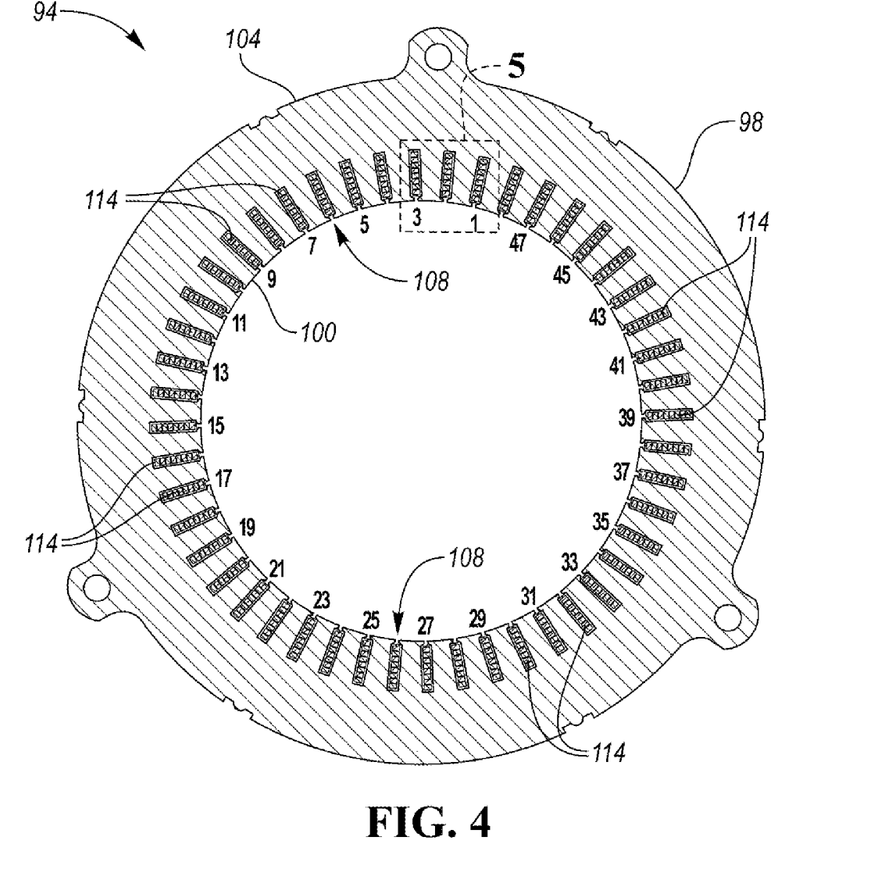
FIG. 4 is a cross-sectional end view of a stator of the electric machine.

Referring to FIGS. 3 and 4, the M/G 14 may include a housing 92 that encloses the stator 94 and the rotor 96. The stator 94 may be fixed to the housing 92 and includes a cylindrical stator core 98 having an inner diameter (ID) 100 that defines a hole 102 and an outer diameter (OD) 104. The stator core 98 may be formed from a plurality of stacked laminations. The rotor 96 is supported for rotation within the hole 102. The rotor 96 may include windings or permanent magnets that interact with magnetic field generated by the windings of the stator 94 to generate rotation of the rotor 96 when the M/G 14 is energized. The rotor 96 may be supported on a shaft 106 that extends through the housing 92. The shaft 106 is configured to couple with a drivetrain of the vehicle to output torque for vehicle propulsion or receive mechanical regenerative energy from vehicle motion.

The stator core 92 defines circumferentially-arranged slots 108 around the stator core 98 and extending outward from the inner diameter 100. The slots 108 are configured to receive the hairpins windings 114. The slots 108 may be equally spaced around the circumference, may be circumferentially arranged between the inner diameter 100 and the outer diameter 104 of the stator core 98 (e.g., the slots 108 may extend radially from the inner diameter 100 to the outer diameter 104 of the stator core 98), and may extend axially from a first end 110 of the stator core 98 to a second end 112. Each slot 108 has a plurality of pin positions that is arranged in a direction that extends from the inner diameter 100 toward the outer diameter 104 of the stator core 98. In the illustrated embodiment, the stator core 98 defines forty-eight slots and has eight poles, but the stator core 98 may include more or fewer slots and/or poles in other embodiments. For example, the stator core 98 may define seventy-two slots and have eight poles.

The slots 108 are spaced by a circumferential distance measured between the center lines of two adjacent slots. This distance can be used as a unit of distance (hereinafter "a slot") for relating to, and measuring, other components of the stator 94. The distance unit "slot" is also sometimes referred to as "slot pitch" or "slot span." The slots 108 are also referenced by numbers 1 through 48 in the counter-clockwise direction with the odd number slots being labeled for convenience. The slots may be characterized as odd slots (i.e., slots 1, 3, 5, etc.) and even slots (i.e., slots 2, 4, 6, etc.). The odd and even designation is for ease of description in explaining the arrangement of the windings, and the structure of odd and even slots may be the same.

Figure 5:
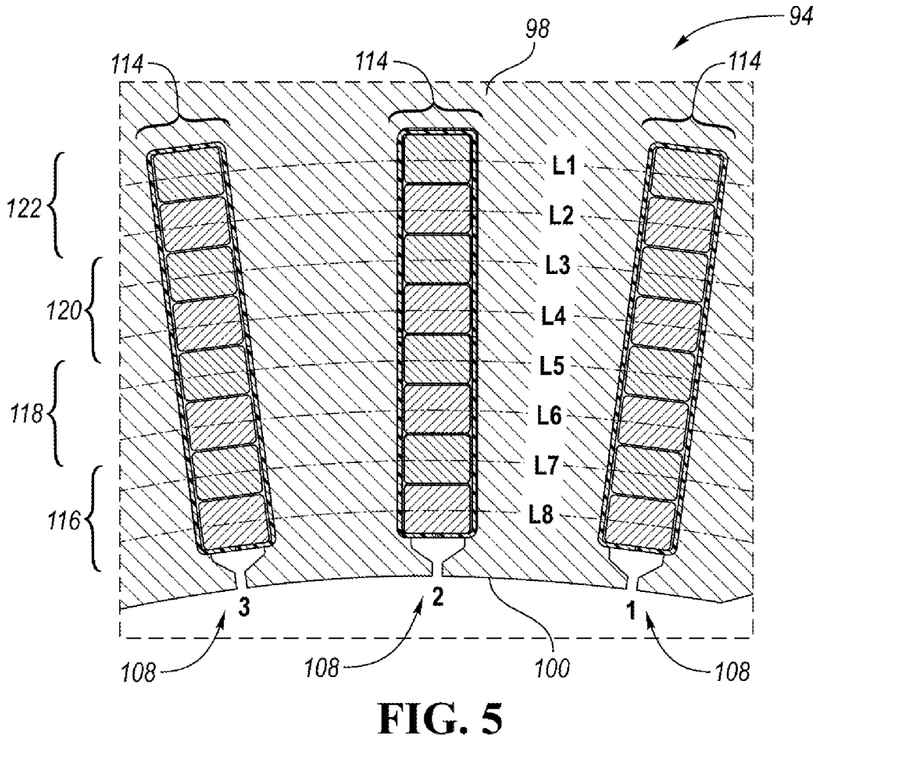
FIG. 5 is a magnified view of a portion of FIG. 2.

Referring to FIG. 5, the M/G 14 includes hairpin windings 114 routed through the slots 108 of the stator core 98. Hairpin winding configurations can improve efficiency for electric machines used in vehicles as well as other applications. The hairpin windings 114 improve efficiency by providing a greater amount of stator conductors to reduce resistance of the winding without encroaching into space reserved for the electrical steel and the magnetic flux path. The hairpin windings may be arranged as wave windings in which the windings 114 weave from pole to pole in a wave-like pattern. It should be noted that the windings 114 are shown as cross-sections in FIG. 5 for illustrative purposes.

The M/G 14 of the present disclosure may be a three-phase current electric machine in which the hairpin windings are arranged in three electrical phases. The phases may be referred to first, second, and third phases in any order. In the examples of the present disclosure, each phase includes a plurality of individual hairpin conductors arranged in parallel winding paths. For example, each phase may include a plurality of individual hairpin conductors arranged in four parallel winding paths. This disclosure, however, should not be construed as limited to an electric machine having three electrical phases but should be construed to include an electric machine having at least one electrical phase or a plurality of electrical phases.

The slots 108 may include an inner radial layer 116 of hairpins, an inner middle radial layer 118 of hairpins, an outer middle radial layer 120 of hairpins, and an outer radial layer 122 of hairpins. Each of the layers may include at least two radial pin positions that are adjacent to each other. In the illustrated embodiment, each slot 108 has eight sequential pin positions (i.e., L1 through L8) in a one-by-eight linear arrangement, however, other arrangements are contemplated. The first position L1, is nearest the OD 104 of the stator core 98 and the eighth position L8 is nearest the ID 100 of the stator core 98. The innermost radial layer 116 includes both the seventh position L7 and the eighth position L8. The inner middle radial layer 118 includes both the fifth position L5 and the sixth position L6. The outer middle radial layer 120 includes both the third position L3 and the fourth position IA. The outermost radial layer 122 includes both the first position L1 and the second position L2.

Figure 6:
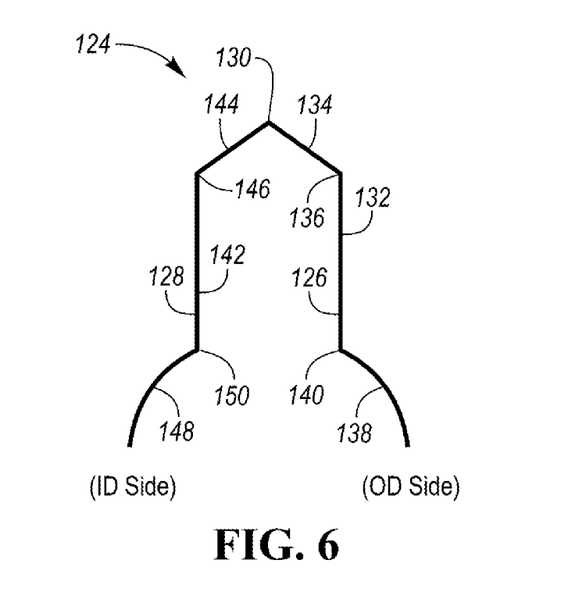
FIG. 6 is a front view of a hairpin.

Referring to FIG. 6, one of a plurality of the hairpins 124 that form the windings 114 are schematically depicted to show the general configuration. The hairpins are generally U-shaped and include a pair of legs joined by a crown. Each of a plurality of hairpins are installed in the stator core 98 by routing each leg portion through a corresponding one of the slots 108. Each hairpin may be installed from the same end of the stator core 98 (e.g., from end 110) so that once installed all of the crowns are located on one end of the stator, and the ends of the legs all are located on the opposing end (e.g., end 112). Generally, end 110 may be referred to as the crown end and end 112 may be referred to as the weld end. Once installed, the legs of the hairpins are bent away from each other to form twists that connect with the twists of other hairpins. The ends of corresponding hairpins are joined by an electrically conductive connection such as a weld. The connections may be arranged in rows. The windings 114 may be jumper-less (i.e., each hairpin is interconnected to another hairpin directly) or may include a minimum number of jumpers. A jumper is a conductor that is typically disposed at one of the ends of the stator core, i.e., does not extend through a slot, and interconnects hairpins that are spaced far enough apart that they cannot be directly connected to each other.

Each arrangement may include hairpins as described in FIG. 6. Hairpin 124 may be formed from a single piece of metal such as copper, aluminum, silver, or any other electrically conductive material. The hairpin 124 may include a first leg 126 joined to a second leg 128 at a vertex 130. The first leg 126 is disposed within in one of the slots 108 and the second leg 128 is disposed in another of the slots 108 that is spaced apart by a span of slots. The first leg 126 includes a straight portion 132 disposed within a slot 108 and a first angled portion 134 that extends between the vertex 130 and the straight portion 132. The straight portion 132 and the angled portion 134 are joined at a first bend 136. The first leg 126 also includes a twist portion 138 that is angled outward at a second bend 140. The second leg 128 includes a straight portion 142 disposed within a slot 108 and a second angled portion 144 that extends between the vertex 130 and the straight portion 142. The first and second angled portions 134, 144 and the vertex 130 by be collectively referred to as a crown. The straight portion 142 and the angled portion 144 are joined at a first bend 146. The second leg 128 also includes a twist portion 148 that is angled outward at a second bend 150. The twists 138, 148 are angled in opposing directions to extend away from the hairpin 124 to connect with adjacent pins of the wiring path. The twists 138, 148 may have a pitch span that is equal to the pin span between adjacent hairpins divided by two.

The hairpin 124 may be fabricated by first forming the vertex 130, the first angled portions 134, 144, and the two extended straight portions. Then, the hairpin 124 is installed into the stator 94 by inserting the extended straight portions into the slots 108 of the stator 94. The second bends 140, 150 and the twists 138, 148 may be formed after the hairpin 124 is installed through the slots by bending the extended legs as desired. The first and last regular pins of a wiring path may have a longer or shorter twist to facilitate connection with the terminal leads or neutral connections.

Figure 7:
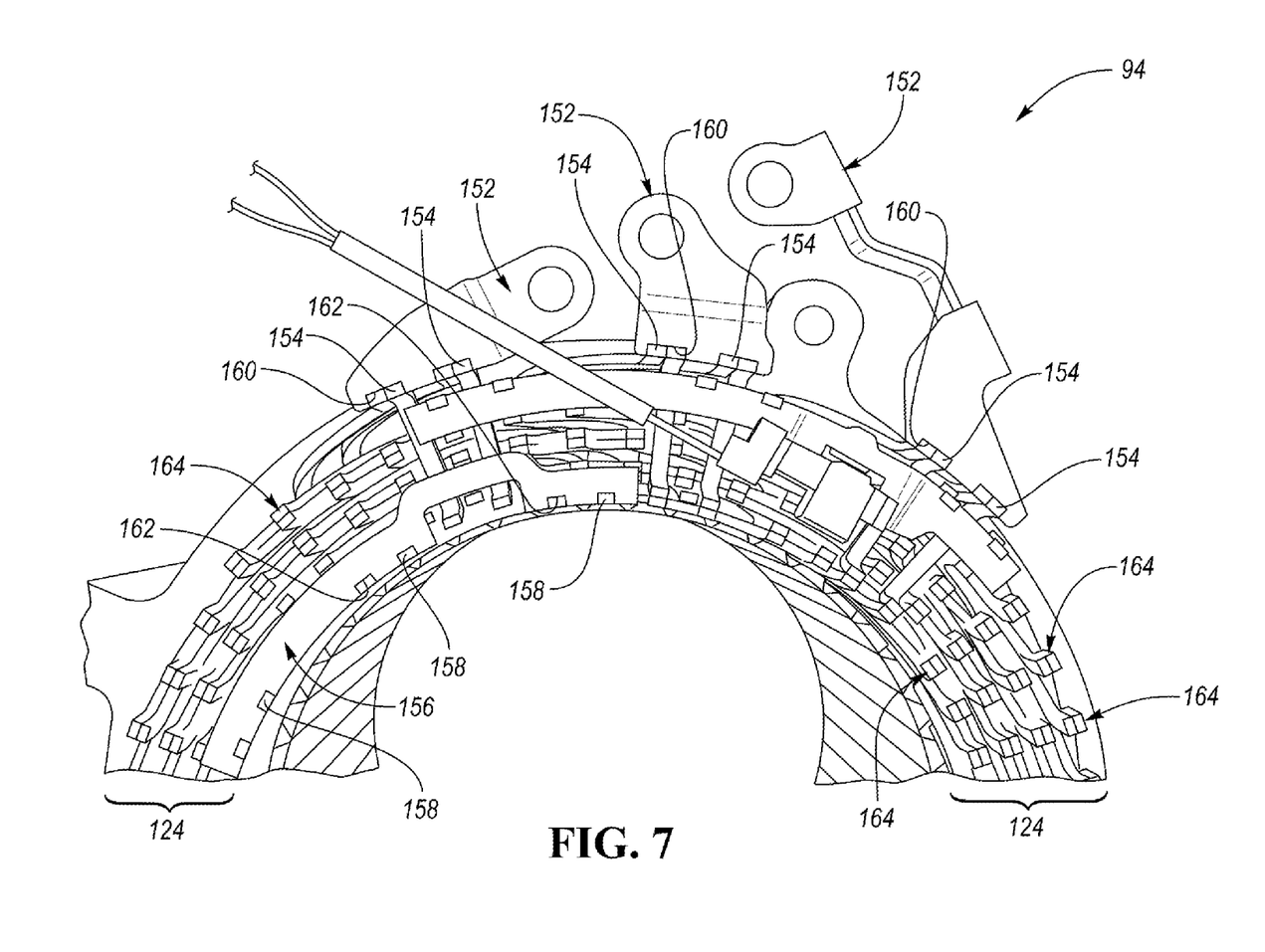
FIG. 7 is a partial top isometric view of the stator of the electric machine.

Referring to FIG. 7, a partial top isometric view of the stator 96 is illustrated. Each phase 88 of the M/G 14 is comprised of at least one set of interconnected hairpins 124. Each phase 88 is connected to a separate terminal 152 along first ends 154 of the interconnected hairpins 124 forming the particular phase 88. Each phase 88 is also connected to a common neutral bar 156 along second ends 158 of the interconnected hairpins 124 forming each phase 88. The first ends 154 and the second ends 158 of the interconnected hairpins 124 may be referred to terminals for each phase 88. The terminals 152 may define a first plurality of orifices 160 that are configured to receive the first ends 154 of the interconnected hairpins 124. The neutral bar 156 may define a second plurality of orifices 162 that are configured to receive the second ends 158 of the interconnected hairpins 124. The terminals 152 are configured to connect the M/G 14, and more specifically the windings 114, to the battery 22 via power electronics 24 (e.g., the inverter 68). The neutral bar 156 is configured to connect the M/G 14, and more specifically the windings 114, to neutral or ground to complete the electrical circuit from the battery 22 to the M/G 14. Adjacent harpins 124 of each phase 88 may be secured to each other along upper ends 164 forming pairs of hairpins 124. The upper ends 164 may be common or shared by each hairpin 124 within each pair. Adjacent hairpins 124 may be secured to each other via brazing, welding, or by any other known method that connects electrical components and establishes an electrical connection between the electrical components.

The temperature sensor 33 may be disposed on the neutral bar 156 in one of several configurations further described herein. The temperature sensor 33 may be placed on the neutral bar 156 since the neutral point or neutral bar 156 tends to be the hottest location of the M/G 14, which is ideal for measuring the temperature of the M/G 14 for control purposes.

The neutral point or neutral bar 156 may be comprised of a stamped metallic material such as copper. Alternatively, the temperature sensor 33 may be placed at any another location on the M/G 14. For example, the temperature sensor 33 may be place onto one of the upper ends 164 of one of the pairs of hairpins 124.

Figure 8:
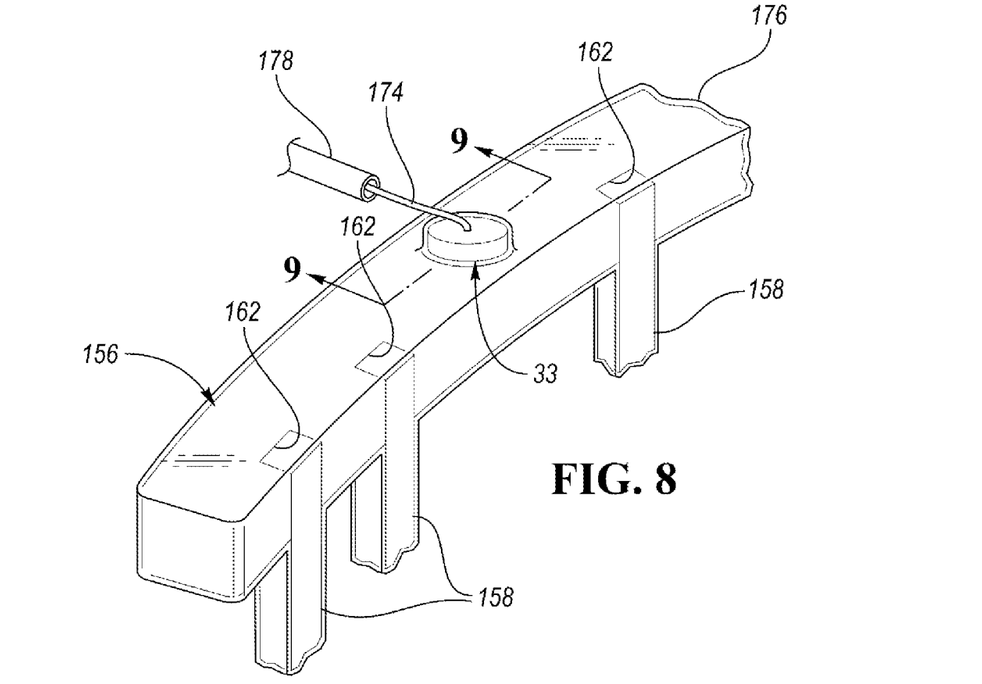
FIG. 8 is a top isometric view of a first configuration of a sensor that measures the temperature of the electric machine.
Figure 9:
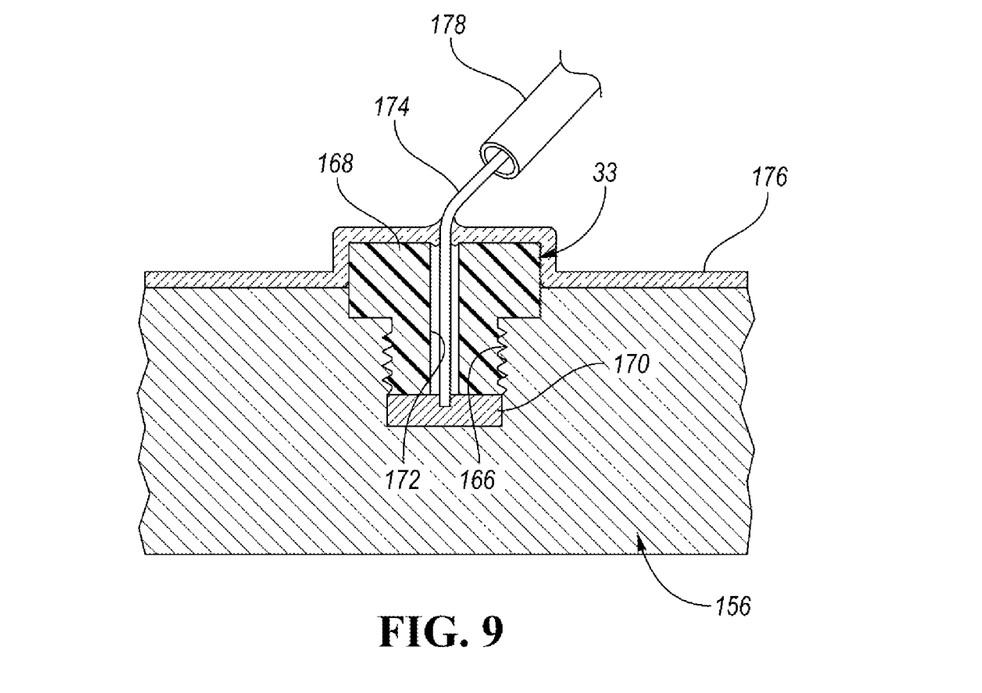
FIG. 9 is a partial cross-sectional view taken along line 9-9 in FIG. 8.

Referring FIGS. 8 and 9, a first configuration of the temperature sensor 33 that is configured to measure the temperature of the M/G 14 is illustrated. The neutral bar 156 defines an orifice 166 in additional to the second plurality of orifices 162. The temperature sensor 33 is disposed within the orifice 166. More specifically, in the first configuration, the orifice 166 may be a tapped orifice and temperature sensor 33 may include a threaded portion 168 that engages the tapped orifice to secure the temperature sensor 33 to the neutral bar 156. Alternatively, the orifice 166 may not be tapped and the temperature sensor 33 may be press-fit or interference-fit into the orifice 166. The temperature sensor 33 includes one or more electrodes 170.

The threaded portion 168 forces the one or more electrodes 170 into contact with the neutral bar 156, once it has been threaded into, or alternatively press-fit into, the orifice 166. The one or more electrodes 170 may be encased in a thermally conductive material, such as a metallic material (e.g., copper or aluminum). The threaded portion 168 defines an orifice 172. A wire harness 174 may connect the one or more electrodes 170 to a power source (e.g., a battery) and/or the controller 32. The stator core 96, windings 114, temperature sensor 33, and neutral bar 156 may be collectively coated with an insulating epoxy or varnish material 176 once the M/G 14 is assembled. Insulating epoxy or varnish materials may include, but are not limited to, polyester based resins like polyester imide resin, epoxies, or alkyds. The insulating varnish 176 may effectively both provide electrical insulation and provide structural rigidity to the M/G 14, but more particular to the windings 114. The varnish 176 may further function to secure the position of the temperature sensor 33. The wire harness 174 may be covered or coated with a sleeve 178 made from a flexible material, such as silicone to prevent the 174 varnish from making the wire harness 174 rigid and brittle.

Figure 10:
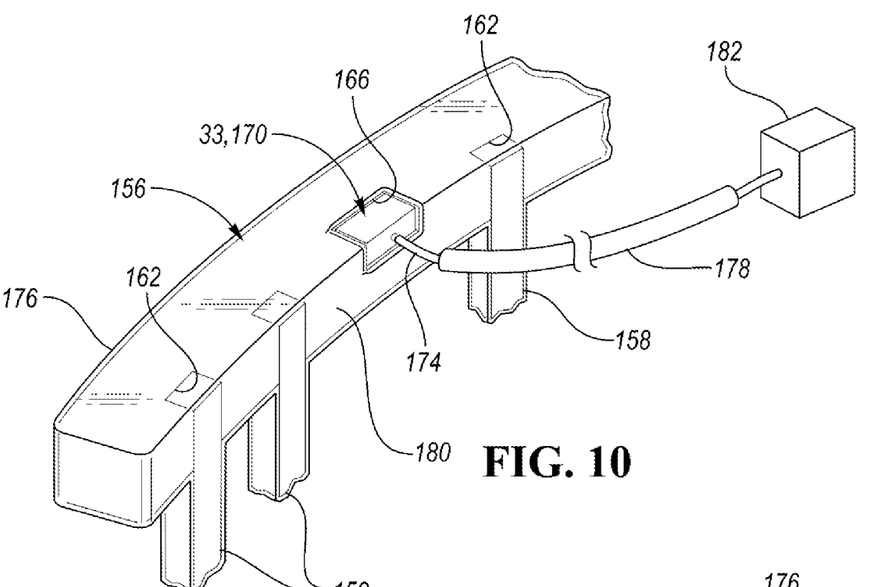
FIG. 10 is a top isometric view of a second configuration of the sensor.

Referring FIG. 10, a second configuration of the temperature sensor 33 that is configured to measure the temperature of the M/G 14 is illustrated. The second configuration of the temperature sensor 33 should be construed to include all of the structure, attributes, and functionality of the first configuration of the temperature sensor 33 unless otherwise stated herein. In the second configuration, the orifice 166 is a notch defined along an outer edge 180 of the neutral bar 156. The notch may more specifically be defined along an intersection of two surfaces of the neutral bar 156. In the illustrated example of FIG. 2, the notch is defined along the intersection of a top surface and a side surface of the neutral bar 156. The temperature sensor 33 in the second configuration may simply comprise the one or more electrodes 170 encased in the thermally conductive material, which may be press-fit or interference-fit into the notch. In the second configuration, the temperature sensor 33 and the neutral bar 156 are also collectively coated with the insulating varnish material 176. An electrical connector 182 that is disposed along an opposing end of the wire harness 174 relative to the temperature sensor 33 may be covered with a silicone (or other flexible material) mask to prevent the insulating varnish material 176 from coating the electrical contacts of the electrical connector 182. The mask may be later removed so that the electrical connector 182 may be connected to an associated connector.

Figure 11:
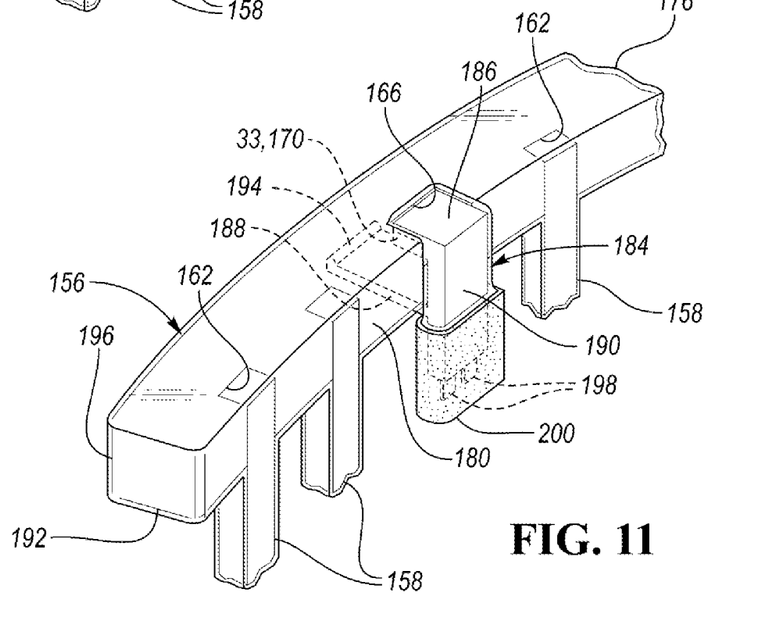
FIG. 11 is a top isometric view of a third configuration of the sensor.

Referring FIG. 11, a third configuration of the temperature sensor 33 that is configured to measure the temperature of the M/G 14 is illustrated. The third configuration of the temperature sensor 33 should be construed to include all of the structure, attributes, and functionality of the first and second configurations of the temperature sensor 33 unless otherwise stated herein. In the second configuration, the orifice 166 is also a notch defined along the outer edge 180 of the neutral bar 156. In the third configuration, the temperature sensor 33 is secured to a C-clamp 184. The C-clamp has first and second flanges 186, 188 that extend from a web 190. The temperature sensor 33 may more specifically be secured to the first flange 186. The temperature sensor 33 may comprise the one or more electrodes 170 encased in the thermally conductive material. The temperature sensor 33 and the first flange 186 may extend into the notch. The second flange 188 may engage an opposing side 192 of the neutral bar 156 relative to the notch. The second flange 188 may include a rib 194 that grips and opposing side 196 of the neutral bar 156 relative to the web 190 to secure the position of the C-clamp 184 on the neutral bar 156.

The C-clamp 184 may be made from a plastic insulating material. Electrical connectors 198, that may be configured to connect the one or more electrodes 170 to a power source (e.g., a battery) and/or the controller 32, may disposed within and insulated by the C-clamp 184. The electrical connectors 198 may protrude from an end of the web 190. The C-clamp 184 and the electrical connectors 198 may form a male electrical connector. More specifically, the web 190 and the electrical connectors 198 may form the male connector. The portion of the C-clamp and electrical connectors 198 forming the male connector may be covered with a mask 200 to prevent the insulating varnish material 176 from coating the electrical contacts of the electrical connector 182 during the process where the varnish material 176 is be deposited onto the M/G 14. The mask 200 may later be removed to connect a wire harness to the male connector. The advantage with this design (i.e., the third configuration of the temperature sensor 33) is that it eliminates varnish process challenges presented by dangling wires (e.g., the wires interfering with the manufacturing process due to the positional variability of wires, the possibility of the wires becoming rigid once the varnish is applied, the wires preventing an area from being coated that requires the varnish, etc.).

Figure 12:
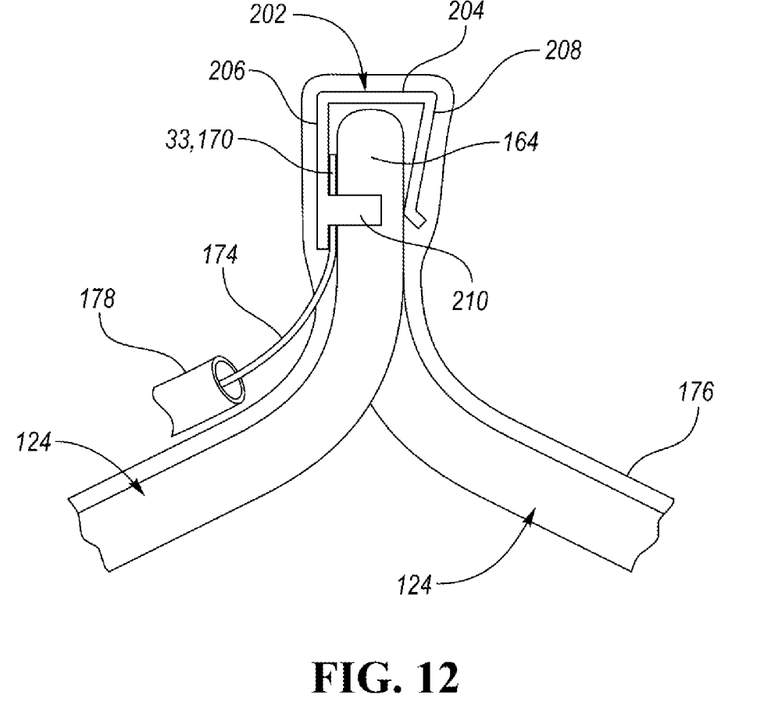
FIG. 12 is a top isometric view of a fourth configuration of the sensor.

Referring FIG. 12, a fourth configuration of the temperature sensor 33 that is configured to measure the temperature of the M/G 14 is illustrated. The second configuration of the temperature sensor 33 should be construed to include all of the structure, attributes, and functionality of the first, second, and third configurations of the temperature sensor 33 unless otherwise stated herein. In the third configuration, a clip 202 secures the temperature sensor 33 to the upper end 164 of a first pair of the interconnected hairpins 124. The clip 202 includes a web 204 disposed over a top of the upper end 164 of the first pair of the interconnected hairpins 124. The clip also includes first and second flanges 206, 208 extending downward on opposing sides of the upper end 164 of the first pair of interconnected hairpins 124. The temperature sensor 33 may more specifically be secured to the first flange 206. The clip 202 may be spring-loaded to form a grip or to grab onto the upper end 164 of the first pair of interconnected hairpins 124. More specifically, the clip 202 may be made from spring-steel and the first and second flanges 206, 208 may be biased inward to form a grip or to grab onto the upper end 164 of the first pair of interconnected hairpins 124.

The clip 202 may further comprise side flaps 210 extending horizontally from opposing sides of the first flange 206 and over the upper end 164 of the first pair of interconnected hairpins 124. The advantage with this design (i.e., the fourth configuration of the temperature sensor 33) is that it allows the temperature sensor 33 to be installed on any hairpin pair (please note that the hotspot may not be at the neutral bar 156 in all applications as it is dependent on the cooling capability of the system).

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a battery;
    an electric machine configured to draw electrical power from the battery to propel the vehicle, the electric machine having a rotor and a stator, the stator having,
        a core defining slots,
        interconnected hairpin windings arranged within the slots and arranged to form a plurality of electrical phases, and
        a neutral bar connected to each of the electrical phases and defining an orifice;
    a thermistor disposed within the orifice and configured to sense a temperature of the electric machine; and
    a controller programmed to control a power output of the electric machine based on the temperature of the electric machine.

2. The vehicle of claim 1, wherein the orifice is a tapped orifice, and wherein the thermistor includes a threaded portion engaging the tapped orifice.

3. The vehicle of claim 1, wherein the orifice is a notch defined along an outer edge of the neutral bar.

4. The vehicle of claim 3, wherein the thermistor is press-fit into the notch.

5. The vehicle of claim 3 further comprising a C-clamp having first and second flanges extending from a web, wherein the thermistor is secured to the first flange, and wherein the first flange and the thermistor each extend into the notch.

6. The vehicle of claim 5, wherein the second flange engages an opposing side of the neutral bar relative to the notch.

7. The vehicle of claim 5 further comprising electrical connectors extending from the thermistor and protruding from an end of the web.

8. The vehicle of claim 1, wherein the neutral bar and the thermistor are collectively coated with an insulating varnish.

9. An electric machine configured to a propel a vehicle comprising:
    a rotor;
    a stator having windings (i) arranged to form a plurality of electrical phases and (ii) configured to generate a magnetic field that interacts with the rotor to generate rotational motion;
    a neutral bar connected to each of the electrical phases and defining (i) at least one first orifice configured to receive terminals for each phase and (ii) a second orifice; and
    a sensor (i) disposed within the second orifice, (ii) configured to sense a temperature of the electric machine, and (iii) configured to communicate the temperature of the electric machine to a controller.

10. The electric machine of claim 9, wherein the second orifice is a tapped orifice, and wherein the sensor includes a threaded portion engaging the tapped orifice.

11. The electric machine of claim 9, wherein the second orifice is a notch defined along an outer edge of the neutral bar.

12. The electric machine of claim 11, wherein the sensor is press-fit into the notch.

13. The electric machine of claim 11 further comprising a C-clamp having first and second flanges extending from a web, wherein the sensor is secured to the first flange, and wherein the first flange and the sensor each extend into the notch.

14. The electric machine of claim 13, wherein the second flange engages an opposing side of the neutral bar relative to the notch.

15. The electric machine of claim 13 further comprising electrical connectors extending from the sensor and protruding from an end of the web.

16. The electric machine of claim 9, wherein the neutral bar and the sensor are collectively coated with an insulating varnish.

17. A vehicle comprising:
    a battery;
    an electric machine configured to draw electrical power from the battery to propel the vehicle, the electric machine having a rotor and a stator, the stator having windings comprising interconnected hairpins; and
    a thermistor configured to sense a temperature of the electric machine; and
    a clip securing the thermistor to an upper end of a first pair of the interconnected hairpins.

18. The vehicle of claim 17, wherein the clip includes (i) a web disposed over a top of the upper end of the first pair of the interconnected hairpins and (ii) first and second flanges extending downward on opposing sides of the upper end of the first pair of interconnected hairpins.

19. The vehicle of claim 18 further comprising side flaps extending horizontally from opposing sides of the first flange and over the upper end of the first pair of interconnected hairpins.

20. The vehicle of claim 17, wherein the clip is spring-loaded.

\* \* \* \* \*